(12) United States Patent
Peri (10) Patent No.: US 11,099,396 B2
(45) Date of Patent: Aug. 24, 2021

(54) DEPTH MAP RE-PROJECTION BASED ON IMAGE AND POSE CHANGES

(71) Applicant: Samsung Electronics Company, Ltd., Suwon-si (KR)

(72) Inventor: Christopher A. Peri, Mountain View, CA (US)

(73) Assignee: SAMSUNG ELECTRONICS COMPANY, LTD., Gyeonggi-Do (KR)

( * ) Notice: Subject to any disclaimer, the term of this patent is extended or adjusted under 35 U.S.C. 154(b) by 0 days.

(21) Appl. No.: 16/996,610

(22) Filed: Aug. 18, 2020

(65) Prior Publication Data

US 2020/0379262 A1    Dec. 3, 2020

Related U.S. Application Data

(60) Provisional application No. 63/008,592, filed on Apr. 10, 2020.

(51) Int. Cl.
| | | |
|---|---|---|
| *G02B 27/01* | (2006.01) | |
| *G02B 27/00* | (2006.01) | |
| *G06T 15/20* | (2011.01) | |
| *G06T 19/00* | (2011.01) | |
| *G06T 7/73* | (2017.01) | |

(52) U.S. Cl.
CPC ..... *G02B 27/0172* (2013.01); *G02B 27/0093* (2013.01); *G06T 7/74* (2017.01); *G06T 15/205* (2013.01); *G06T 19/006* (2013.01); *G06T 2207/30244* (2013.01)

(58) Field of Classification Search
CPC .. G02B 27/0172; G02B 27/0093; G06T 7/74; G06T 15/205; G06T 19/006
See application file for complete search history.

(56) References Cited

U.S. PATENT DOCUMENTS

| | | | |
|---|---|---|---|
| 9,832,451 B2 | 11/2017 | Selstad | |
| 10,212,428 B2 | 2/2019 | Trepte | |
| 10,515,485 B2 | 12/2019 | Mallinson | |
| 10,679,378 B1 | 6/2020 | Reddy | |
| 2015/0002542 A1 | 1/2015 | Chan | |
| 2018/0082484 A1 | 3/2018 | Mallinson | |
| 2018/0275748 A1 | 9/2018 | Haraden | |
| 2019/0378340 A1* | 12/2019 | Chia | G06F 3/04815 |

(Continued)

FOREIGN PATENT DOCUMENTS

| | | |
|---|---|---|
| KR | 10-2016-0026898 | 3/2016 |
| KR | 10-2016-0033763 | 3/2016 |
| KR | 10-2017-0034602 | 3/2017 |

*Primary Examiner* — Sarah Lhymn
(74) *Attorney, Agent, or Firm* — Baker Botts L.L.P.

(57) ABSTRACT

A method implemented by an extended reality (XR) display device includes rendering a current image frame received from an external electronic device associated with the XR display device. The current image frame is associated with a current pose of the XR display device. The method further includes receiving an updated image frame from the external electronic device, calculating an updated pose based on one or more characteristics of the updated image frame, and determining whether the updated pose is within a pose range with respect to the current pose. The method thus further includes re-rendering, on one or more displays of the XR display device, a previous image frame based on whether the current pose is determined to be within the pose range.

20 Claims, 5 Drawing Sheets

(56) References Cited

U.S. PATENT DOCUMENTS

2020/0043223 A1    2/2020  Leiby
2020/0090368 A1*  3/2020  Szeto .................... G06F 3/0346
2021/0063735 A1*  3/2021  Cai .................... G02B 27/0101

* cited by examiner

DEPTH MAP RE-PROJECTION BASED ON IMAGE AND POSE CHANGES

PRIORITY

This application claims the benefit under 35 U.S.C. § 119(e) of U.S. Provisional Patent Application No. 63/008,592, filed 10 Apr. 2020, which is incorporated herein by reference.

TECHNICAL FIELD

This disclosure relates generally to depth maps, and, more particularly, to the re-projection of depth maps based on image and pose updates.

BACKGROUND

An extended reality (XR) system may generally include a computer-generated environment and/or a real-world environment that includes at least some XR artifacts. Such an XR system or world and associated XR artifacts typically include various applications (e.g., video games), which may allow users to utilize these XR artifacts by manipulating their presence in the form of a computer-generated representation (e.g., avatar). In typical XR systems, image data may be rendered on, for example, a robust head-mounted display (HMD) that may be coupled through a physical wired connection to a base graphics generation device responsible for generating the image data. However, in some instances, in which the HMD includes, for example, lightweight XR glasses or spectacles as opposed to more robust headset devices, the XR glasses or spectacles may, in comparison, include reduced processing power, low-resolution/low-cost cameras, and/or relatively simple tracking optics. Additionally, due to the smaller architectural area, the XR glasses or spectacles may also include reduced power management (e.g., batteries, battery size) and thermal management (e.g., cooling fans, heat sinks) electronics. This may often preclude such devices from maximizing performance while reducing power consumption. It may be thus useful to provide techniques to improve lightweight XR systems.

DESCRIPTION OF EXAMPLE EMBODIMENTS

The present embodiments are directed toward techniques for selectively re-projecting depth maps based on image and depth data and pose data updates. In particular embodiments, an extended reality (XR) display device may render a current image frame received from an external electronic device associated with the XR display device. In particular embodiments, the current image frame may be associated with a current pose of the XR display device. In particular embodiments, the XR display device may then receive an updated image frame from the external electronic device. In particular embodiments, the XR display device may then calculate an updated pose based on one or more image or depth characteristics of the updated image frame. For example, in particular embodiments, the one or more image or depth characteristics may include one or more of an image content range, a depth density, an image content depth, or a depth continuity. In particular embodiments, the XR display device may then determine whether the updated pose is within a pose range with respect to the current pose associated the current image frame. For example, in particular embodiments, prior to determining whether the updated pose is within the pose range with respect to the current pose, the XR display device may calculate a suitable pose range with respect to the current pose, in which the suitable pose range may be determined based on a target image quality. In particular embodiments, the XR display device may then re-render, on one or more displays of the XR display device, a previous image frame based on whether the current pose is determined to be within the pose range.

In particular embodiments, the XR display device may then continuously monitor for a receipt of a second updated image frame from the external electronic device. In particular embodiments, responsive to receiving a second updated image frame, the XR display device may then calculate a second updated pose based on one or more image or depth characteristics of the second updated image frame. For example, as previously discussed, in particular embodiments, the one or more image or depth characteristics may include one or more of an image content range, a depth density, an image content depth, or a depth continuity. In particular embodiments, in response to determining that the second updated pose is not within the calculated pose range with respect to the current pose, the XR display device may then determine whether one or more anchors corresponding to the second updated pose are stored on the XR display device. For example, in particular embodiments, the XR display device may store over time a number of anchors, which may each include a data element, an object instance, or a bounding box that includes a particular pose stored together with its associated image and depth dataset. In particular embodiments, in response to determining that the one or more anchors corresponding to the second updated pose are stored on the XR display device, the XR display device may access the image data or depth data corresponding to the one or more anchors. In particular embodiments, the XR display device may then determine whether the second updated pose is within an updated pose range corresponding to the one or more anchors. The XR display device may then render, on the one or more displays of the XR display device, the second updated image frame when the second updated pose is determined to be within the updated pose range.

Thus, in accordance with the presently disclosed embodiments, to reduce network traffic between the XR display device and an external electronic device, and, by extension, to reduce power consumption and thermal output of the XR display device, based on whether a pose associated with a current image frame is within a suitable pose range, the XR display device may forgo rendering the current image frame and instead re-render the previous image frame on the one or more displays of the XR display device. In particular embodiments, even in the case in which the pose associated with the current image frame is not within the suitable pose range, the XR display device may access image data or depth data corresponding to one or more stored anchors that correspond to the pose associated with the current image frame and adjust the current image frame and suitable pose range based thereon.

Accordingly, in accordance with the presently disclosed embodiments, the XR display device may either continuously re-render (e.g., re-project) a 2D or 3D image that was already being displayed by the one or more displays of the XR display device or adjust a current image frame to be displayed based on stored anchors, such that the XR display device may forgo unnecessarily relying upon the external electronic device to provide image data or depth data refresh updates that would otherwise include the same or nearly the same image content or depth content as the 2D or 3D images already being displayed or next to be displayed by the XR display device. Thus, in accordance with the present techniques, even in the case in which XR display device includes reduced power management (e.g., batteries, battery size) and thermal management (e.g., cooling fans, heat sinks) electronics, the XR display device may nevertheless provide desirable XR experiences to users while also reducing power consumption and thermal output.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Further, as used herein, it should be appreciated that "extended reality" may be associated with applications, products, accessories, services, or a combination thereof, that, for example, may be utilized to create content in extended reality and/or utilized in (e.g., perform activities) in extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers. Furthermore, as used herein, a "current image frame" may refer to a most recent image frame or a most recent set of image frames that may be either sent (e.g., pushed) to an XR display device from a computing platform or requested or loaded (e.g., pulled) from the computing platform by the XR display device for image or depth processing and analysis. For example, in particular embodiments, the "current image frame" may simply correspond to the latest image frame (of an N set of RGBD image frames being rendered by the computing platform) that may be pushed to, or pulled by, the XR display device. That is, all of the image frames of the N set of RGBD image frames may not be provided from the computing platform to the XR display device, and thus the "current image frame" may simply refer to the most recent image that is indeed sent from the computing platform to the XR display device.

Figure 1:
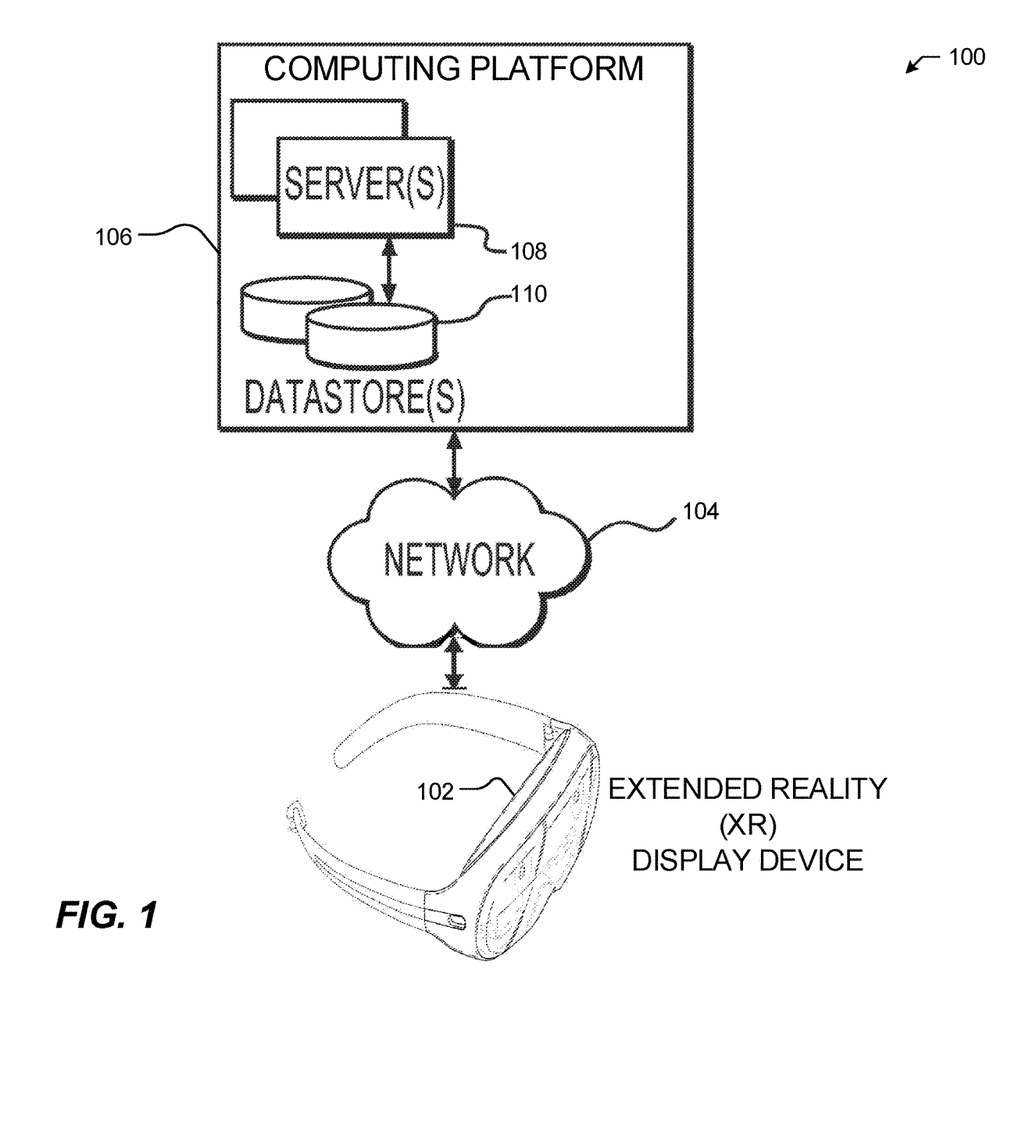
FIG. 1 illustrates an example extended reality (XR) system.

FIG. 1 illustrates an example extended reality (XR) system 100 that may be suitable for selectively re-projecting depth maps based on image and depth data and pose data updates, in accordance with presently disclosed embodiments. In particular embodiments, the XR system 100 may include an XR display device 102, a network 104, and a computing platform 106. In particular embodiments, a user may wear the XR display device 102 that may display visual extended reality content to the user. The XR display device 102 may include an audio device that may provide audio extended reality content to the user. In particular embodiments, the XR display device 102 may include one or more cameras which can capture images and videos of environments. The XR display device 102 may include an eye tracking system to determine the vergence distance of the user. In particular embodiments, the XR display device 102 may include a lightweight head-mounted display (HMD) (e.g., goggles, eyeglasses, spectacles, a visor, and so forth). In particular embodiments, the XR display device 102 may also include a non-HMD device, such as a lightweight handheld display device or one or more laser projecting spectacles (e.g., spectacles that may project a low-powered laser onto a user's retina to project and display image or depth content to the user). In particular embodiments, the network 104 may include, for example, any of various wireless communications networks (e.g., WLAN, WAN, PAN, cellular, WMN, WiMAX, GAN, 6LowPAN, and so forth) that may be suitable for communicatively coupling the XR display device 102 to the computing platform 106.

In particular embodiments, the computing platform 106 may include, for example, a standalone host computing system, an on-board computer system integrated with the XR display device 102, a mobile device, or any other hardware platform that may be capable of providing extended reality content to the XR display device 102. In particular embodiments, the computing platform 106 may include, for example, a cloud-based computing architecture (including one or more servers 108 and data stores 110) suitable for hosting and servicing XR applications or experiences executing on the XR electronic device 102. For example, in particular embodiments, the computing platform 106 may include a Platform as a Service (PaaS) architecture, a Software as a Service (SaaS) architecture, and an Infrastructure as a Service (IaaS), or other similar cloud-based computing architecture. As it may be appreciated, in particular embodiments in which the XR display device 102 includes lightweight devices, such as goggles, eyeglasses, spectacles, a visor, and so forth, the XR display device 102 may, due to the smaller architectural area, include reduced power management (e.g., batteries, battery size) and thermal management (e.g., cooling fans, heat sinks) electronics.

Figure 2:
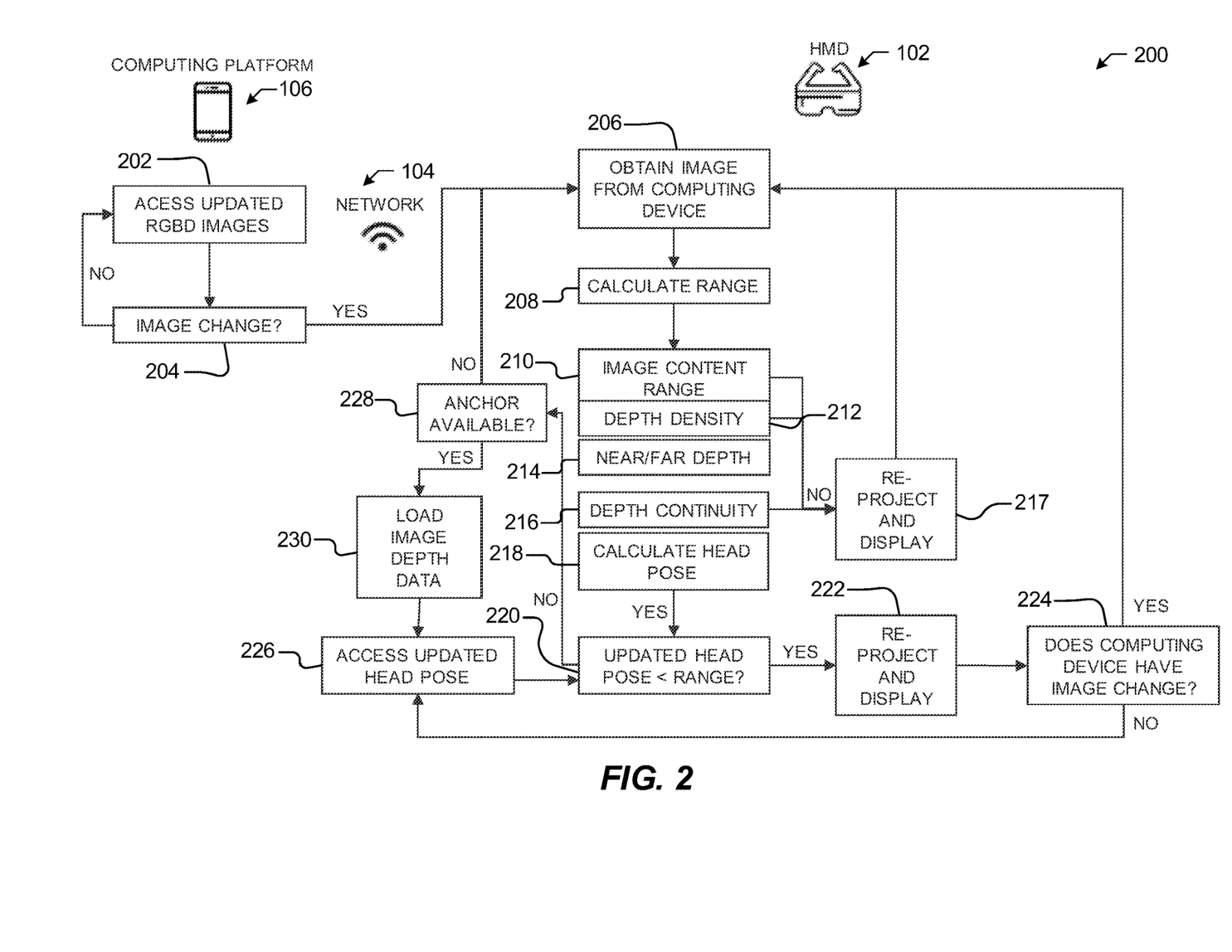
FIG. 2 illustrates a workflow diagram for selectively re-projecting depth maps based on image and depth data and pose data updates.

FIG. 2 illustrates a workflow diagram 200 for selectively re-projecting depth maps based on image and depth data and pose data updates, in accordance with the presently disclosed embodiments. In particular embodiments, the workflow diagram 200 may correspond to, and be performed, for example, by the XR display device 102 and computing platform 106 as discussed above with respect to FIG. 1. In particular embodiments, the workflow diagram 200 may begin at block 202 with the computing platform 106 accessing updated (R)ed, (B)lue, (G)reen color values and (D)epth values with respect to 2D or 3D image being rendered by the computing platform 106 and/or the XR display device 102. For example, in particular embodiments, the computing platform 106 may render both RGB image data and/or RGBD image and depth data based on one or more last known head poses. In particular embodiments, the workflow diagram 200 may then continue at block 204 with the computing platform 106 determining whether the RGB image data has changed. For example, in particular embodiments, the computing platform 106 may detect changes in the RGB image data, as head poses may not be updated unless triggered, for example, by the XR display device 102.

In particular embodiments, in response to determining one or more changes in the RGB image data, the computing platform 106 may, in some instances, provide the RGB image data and/or RGBD image and depth data updates to the XR display device 102 at the same time in which the XR display device 102 may be continuously or periodically monitoring (e.g., at block 224) for whether the computing platform 106 has any RGB image data and/or RGBD image and depth data to provide. For example, in particular embodiments, XR display device 102 may perform continuous or periodic checks to determine whether there are any RGB image data and/or RGBD image and depth data updates to be subsequently rendered by the XR display device 102. In particular embodiments, if there are any RGB image data and/or RGBD image and depth data updates, one or more current image frames may be requested (e.g., over the network 104) from the computing platform 106 by the XR display device 102 (e.g., from block 224 to block 206) or automatically sent (e.g., over the network 104) to the XR display device 102 by the computing platform 106 (e.g., from block 204 to block 206). In particular embodiments, the XR display device 102 may also provide the latest head pose data to computing platform 106 along with the request. On the other hand, if there are not any RGB image data and/or RGBD image and depth data updates, the XR display device 102 may, for example, pause a for a developer-determined or user-determined time period (e.g. 5 milliseconds (ms), 10 ms, 12 ms, 16 ms, 20 ms, and so forth) before requesting again any RGB image data and/or RGBD image and depth data updates from the computing platform 106.

In particular embodiments, the workflow diagram 200 may continue at block 208 with the XR display device 102 calculating a suitable pose range. For example, in particular embodiments, the XR display device 102 may calculate the range of bodily motion (e.g., head motion, gesture motion, and so forth) that may be determined suitable (e.g., based on one or more developer-determined or user-determined image quality preferences or metrics) for re-rending on the XR display device 102 a previously rendered image frame. Specifically, the XR display device 102 may calculate a suitable pose range based on, for example, the amount of head pose translation and rotation that may support a particular image quality (e.g., based on one or more developer-determined or user-determined image quality preferences or metrics) for re-rendering one or more previously-rendered image frames. In one example, the suitable pose range may be expressed as: Head Pose$_{Rotation\ Change}$=Field of View (FOV)° of rendering camera/(1+(preset/distance (m) from Point of View (POV)°)).

In particular embodiments, the workflow diagram 200 may then continue with the XR display device 102 performing one or more image quality criteria based one or more image or depth characteristics at blocks 210, 212, 214, and 216. For example, in particular embodiments, the one or more image or depth characteristics may include, for example, an image content range (e.g., at block 210), a depth density (e.g., at block 212), an image content depth (e.g., near-field or far-field image content depth at block 214), or a depth continuity (e.g., at block 216). In particular embodiments, the image quality criteria based on the one or more image or depth characteristics at blocks 210, 212, 214, and 216 may be developer-determined or user-determined criteria that may be satisfied if only one of the image or depth characteristics at blocks 210, 212, 214, and 216 are within predetermined limits, if only all of the image or depth characteristics at blocks 210, 212, 214, and 216 are within predetermined limits, or if a majority (e.g., 3 out of 4) of the image or depth characteristics at blocks 210, 212, 214, and 216 are within predetermined limits.

In particular embodiments, the XR display device 102 may determine at block 210 whether image content and/or depth content is within a predetermined limit or excessively close to the POV of the XR display device 102. In particular embodiments, the XR display device 102 may determine at block 212 whether image depth density content is within a predetermined level (e.g., whether or not enough depth values are present). In particular embodiments, the XR display device 102 may determine whether near-field depth content and/or far-field content is within a predetermined limit (e.g., determining whether the depth content has a total depth from a near-field point to a far-field point). In particular embodiments, the XR display device 102 may determine at block 216 whether the image depth continuity is within predetermined limits (e.g., determine whether changes from depth point to depth point is beyond a predetermined ratio). For example, in particular embodiments, the XR display device 102 may determine depth continuity by calculating, for each depth point, the depth difference between the depth point and each of N surrounding depth points and determine whether an average depth point change is above one or predetermined limits. Based on the satisfying of the one or more image quality criteria, the workflow diagram 200 may then proceed at block 217 with the XR display device 102 re-projecting and displaying a previously-rendered image frame and recommencing the process again at block 206 and/or block 224.

In particular embodiments, based on non-satisfying of the one or more image quality criteria, the workflow diagram 200 may continue at block 218 with the XR display device 102 calculating an updated head pose associated with the current image frame and determining at block 220 whether the updated head pose is within the calculated pose range. For example, in particular embodiments, the XR display device 102 may determine, for example, whether the updated head pose is within the calculated pose range based on the product: range (rotation r, translation t)*(tolerance) with respect to the calculated pose range. In particular embodiments, in response to determining that the updated head pose is within the calculated pose range at block 220, the workflow diagram 200 may then continue at block 222 with the XR display device 102 re-projecting and displaying (e.g., re-rendering) the previous image frame and at block 224 with the XR display device 102 continuously or periodically monitoring (e.g., at block 224) for whether the computing platform 106 has any RGB image data and/or RGBD image and depth data updates to provide.

In particular embodiments, the XR display device 102 may determine, for example, if one or more sprint animation exists and further determine whether to re-project and display the previous image frame or render the current image frame based thereon. In particular embodiments, if the XR display device 102 determines that there are currently no RGB image data and/or RGBD image and depth data updates to be provided from or requested from the computing platform 106, the workflow diagram 200 may continue at block 226 with the XR display device 102 accessing head pose updates (e.g., based on whether the user makes one or more bodily motions) and continuing to compare the head pose updates to the calculated pose range (e.g., at block 220) and re-projecting and displaying the previous image frame (e.g., at block 222) while the head pose updates remain within the calculated head pose range. In particular embodiments, the XR display device 102 may also define one or more time limits and/or image frame limits for when the XR display device 102 is to request current frame updates from the computing platform 106.

In particular embodiments, in response to determining that the updated head pose is not within the calculated pose range at block 220, the workflow diagram 200 may then continue at block 228 with the XR display device 102 may then determine whether one or more anchors corresponding to the updated head pose are stored on the XR display device 102. For example, in particular embodiments, the XR display device 102 may store over time a number of anchors, which may each include, for example, a data element, an object instance, or a bounding box that includes a particular head pose stored together with its associated image and depth dataset. For example, in particular embodiments, the XR display device 102 may determine whether one or more anchors corresponding the updated head pose is stored on the XR display device 102 and the particular position within the current image frame in which image content or depth content may be updated based on the one or more stored anchors. Specifically, the one or more stored anchors may allow the user to have a larger range of bodily motion (e.g., head motions, gesture motions) without requesting RGB image data and/or RGBD image and depth data updates from the computing platform 106.

In particular embodiments, in response to determining that the one or more anchors corresponding to the updated head pose are stored on the XR display device 102, the workflow diagram 200 may continue at block 230 with the XR display device 102 accessing the image data or depth data corresponding to the one or more anchors. In particular embodiments, the XR display device 102 may then determine whether the newly updated pose is within an updated pose range corresponding to the one or more anchors. The XR display device 102 may then render, on the one or more displays of the XR display device 102, the updated image frame when the updated head pose is determined to be within the updated pose range. It should be appreciated that, in particular embodiments, the anchors stored on the XR display device may not be limited to any particular head pose range. Indeed, in particular embodiments, the one or more anchors or one or more sets of anchors may be utilized to establish one or more updated head poses each associated with a corresponding head pose range. In particular embodiments, upon the updates to the current image frame based on the one or more anchors, the utilized anchors may be discarded. On the other hand, in response to determining that the one or more anchors corresponding to the updated head pose are not stored on the XR display device 102, the workflow diagram 200 may be restart at block 206 with one or more current image frames may be requested (e.g., over the network 104) from the computing platform 106 by the XR display device 102 (e.g., from block 224 to block 206) or automatically sent (e.g., over the network 104) to the XR display device 102 by the computing platform 106 (e.g., from block 204 to block 206).

Thus, in accordance with the presently disclosed embodiments, to reduce network traffic between the XR display device 102 and the computing platform 106, and, by extension, to reduce power consumption and thermal output of the XR display device 102, based on whether a pose associated with a current image frame is within a suitable pose range, the XR display device 102 may forgo rendering the current image frame and instead re-render the previous image frame on the one or more displays of the XR display device 102. In particular embodiments, even in the case in which the pose associated with the current image frame is not within the suitable pose range, the XR display device 102 may access image data or depth data corresponding to one or more stored anchors that correspond to the pose associated with the current image frame and adjust the current image frame and the suitable pose range based thereon.

Accordingly, in accordance with the presently disclosed embodiments, the XR display device 102 may either continuously re-render (e.g., re-project) a 2D or 3D image that was already being displayed by the one or more displays of the XR display device 102 or adjust a current image frame to be displayed based on stored anchors, such that the XR display device 102 may forgo unnecessarily relying upon the computing platform 106 to provide image data or depth data refresh updates that would otherwise include the same or nearly the same image content or depth content as the 2D or 3D images already being displayed or next to be displayed by the XR display device 102. Thus, in accordance with the present techniques, even in the case in which XR display device 102 includes reduced power management (e.g., batteries, battery size) and thermal management (e.g., cooling fans, heat sinks) electronics, the XR display device 102 may nevertheless provide desirable XR experiences to users while also reducing power consumption and thermal output.

Figure 3:
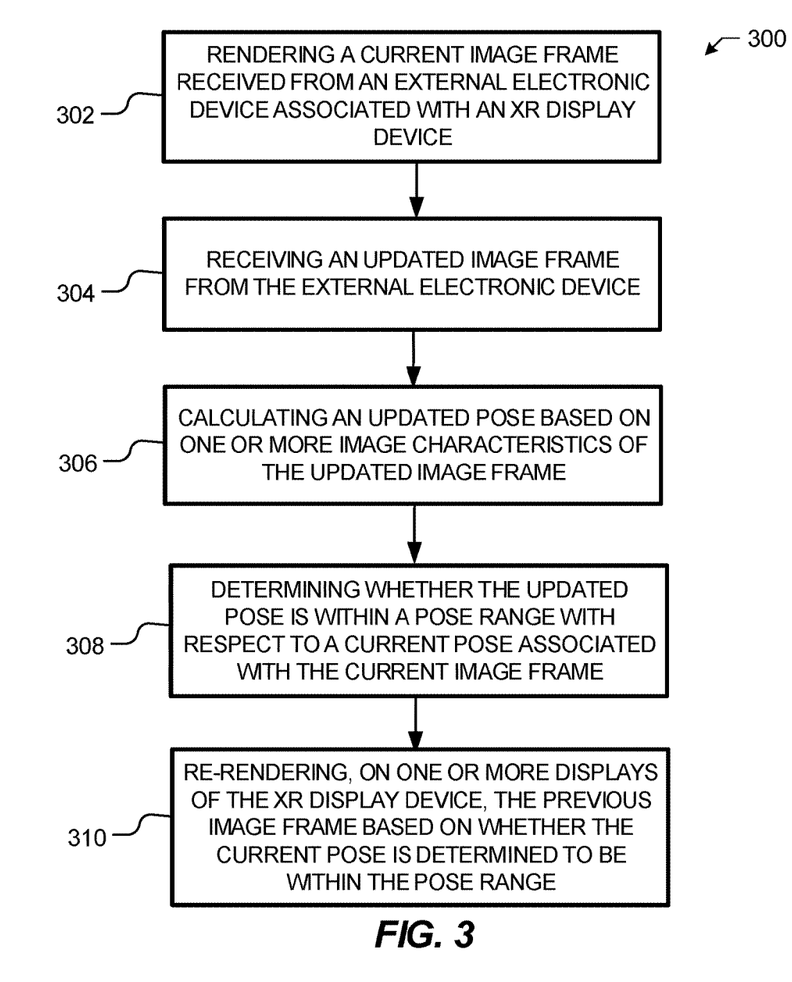
FIG. 3 is a flow diagram of a method for selectively re-projecting depth maps based on image and depth data and pose data updates.

FIG. 3 illustrates is a flow diagram of a method for selectively re-projecting depth maps based on image and depth data and pose data updates, in accordance with the presently disclosed embodiments. The method 300 may be performed utilizing one or more processing devices (e.g., XR display device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 300 may begin block 302 with the one or more processing devices (e.g., XR display device 102) rendering a current image frame received from an external electronic device associated with an XR display device. In particular embodiments, the current image frame may be associated with a current pose of the XR display device. The method 300 may then continue at block 304 with the one or more processing devices (e.g., XR display device 102) receiving an updated image frame from the external electronic device. The method 300 may then continue at block 306 with the one or more processing devices (e.g., XR display device 102) calculating an updated pose based on one or more image or depth characteristics of the updated image frame. The method 300 may then continue at block 308 with the one or more processing devices (e.g., XR display device 102) determining whether the updated pose is within a pose range with respect to a current pose associated the current image frame. For example, in particular embodiments, prior to determining whether the updated pose is within the pose range with respect to the current pose, the XR display device may calculate a suitable pose range with respect to the current pose, in which the suitable pose range may be determined based on a target image quality. The method 300 may then conclude at block 310 with the one or more processing devices (e.g., XR display device 102) re-rendering, on one or more displays of the XR display device, a previous image frame based on whether the current pose is determined to be within the pose range.

Figure 4:
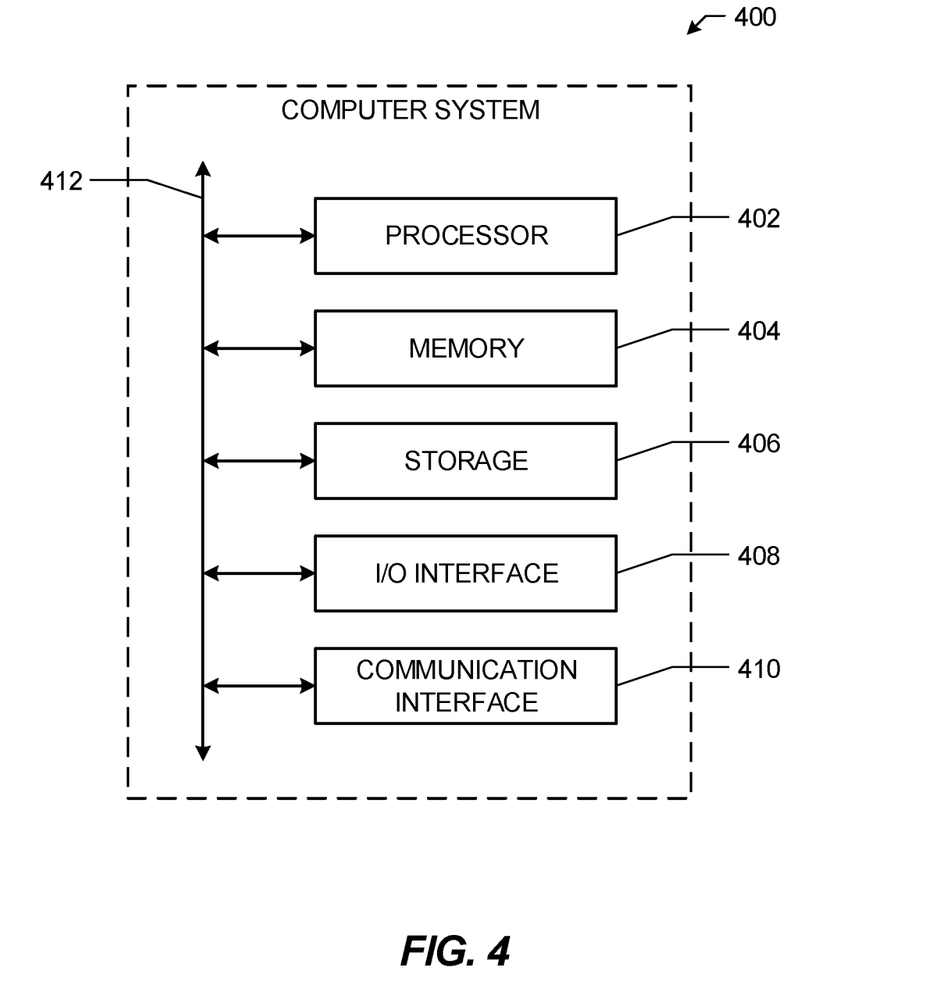
FIG. 4 illustrates an example computer system.

FIG. 4 illustrates an example computer system 400 that may be utilized to perform a real-time or near real-time intelligence-based editing and curating of captured image frames, in accordance with the presently disclosed embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks.

Where appropriate, one or more computer systems 400 may perform without substantial spatial or temporal limitation one or more steps of one or more methods described or illustrated herein. As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement. In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memory devices 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 406 for them. Where appropriate, I/O interface 408 may include one or more device or software drivers enabling processor 402 to drive one or more of these I/O devices. I/O interface 408 may include one or more I/O interfaces 406, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example, and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Figure 5:
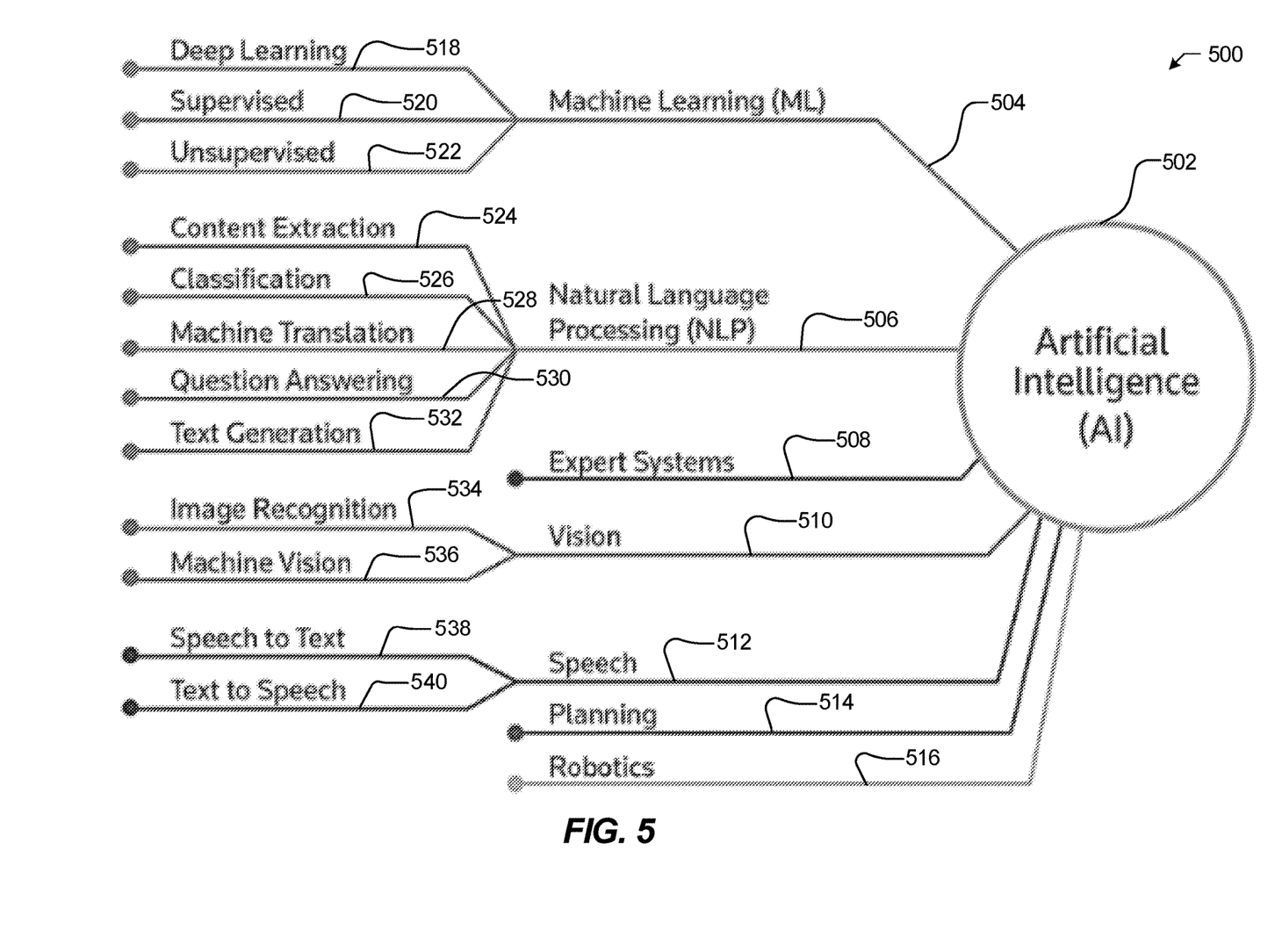
FIG. 5 illustrates a diagram of an example artificial intelligence (AI) architecture.

FIG. 5 illustrates a diagram 500 of an example artificial intelligence (AI) architecture 502 that may be utilized to provide a co-informatic generative adversarial network (CI-GAN) for data co-clustering, in accordance with the presently disclosed embodiments. In particular embodiments, the AI architecture 502 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 6, the AI architecture 502 may include machine leaning (ML) algorithms and functions 504, natural language processing (NLP) algorithms and functions 506, expert systems 508, computer-based vision algorithms and functions 510, speech recognition algorithms and functions 512, planning algorithms and functions 514, and robotics algorithms and functions 516. In particular embodiments, the ML algorithms and functions 504 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 504 may include deep learning algorithms 518, supervised learning algorithms 520, and unsupervised learning algorithms 522.

In particular embodiments, the deep learning algorithms 518 may include any artificial neural networks (ANNs) that may be utilized to learn deep levels of representations and abstractions from large amounts of data. For example, the deep learning algorithms 518 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 520 may include any algorithms that may be utilized to apply, for example, what has been learned in the past to new data using labeled examples for predicting future events. For example, starting from the analysis of a known training dataset, the supervised learning algorithms 520 may produce an inferred function to make predictions about the output values. The supervised learning algorithms 520 can also compare its output with the correct and intended output and find errors in order to modify the supervised learning algorithms 520 accordingly. On the other hand, the unsupervised learning algorithms 522 may include any algorithms that may applied, for example, when the data used to train the unsupervised learning algorithms 522 are neither classified or labeled. For example, the unsupervised learning algorithms 522 may study and analyze how systems may infer a function to describe a hidden structure from unlabeled data.

In particular embodiments, the NLP algorithms and functions 506 may include any algorithms or functions that may be suitable for automatically manipulating natural language, such as speech and/or text. For example, in particular embodiments, the NLP algorithms and functions 506 may include content extraction algorithms or functions 524, classification algorithms or functions 526, machine translation algorithms or functions 528, question answering (QA) algorithms or functions 530, and text generation algorithms or functions 532. In particular embodiments, the content extraction algorithms or functions 524 may include a means for extracting text or images from electronic documents (e.g., webpages, text editor documents, and so forth) to be utilized, for example, in other applications.

In particular embodiments, the classification algorithms or functions 526 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 528 may include any algorithms or functions that may be suitable for automatically converting source text in one language, for example, into text in another language. The QA algorithms or functions 530 may include any algorithms or functions that may be suitable for automatically answering questions posed by humans in, for example, a natural language, such as that performed by voice-controlled personal assistant devices. The text generation algorithms or functions 532 may include any algorithms or functions that may be suitable for automatically generating natural language texts.

In particular embodiments, the expert systems 508 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 510 may include any algorithms or functions that may be suitable for automatically extracting information from images (e.g., photo images, video images). For example, the computer-based vision algorithms and functions 510 may include image recognition algorithms 534 and machine vision algorithms 536. The image recognition algorithms 534 may include any algorithms that may be suitable for automatically identifying and/or classifying objects, places, people, and so forth that may be included in, for example, one or more image frames or other displayed data. The machine vision algorithms 536 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 512 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 538 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 540 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g.

method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an extended reality (XR) display device:
   rendering a current image frame received from an external electronic device associated with the XR display device, wherein the current image frame is associated with a current pose of the XR display device;
   receiving an updated image frame from the external electronic device;
   calculating an updated pose based on one or more characteristics of the updated image frame;
   determining whether the updated pose is within a pose range with respect to the current pose; and
   re-rendering, on one or more displays of the XR display device, a previous image frame based on whether the current pose is determined to be within the pose range.

2. The method of claim 1, wherein the one or more characteristics comprise one or more of an image content range, a depth density, an image content depth, or a depth continuity.

3. The method of claim 1, further comprising:
   prior to determining whether the updated pose is within the pose range with respect to the current pose, calculating the pose range with respect to the current pose, wherein the pose range is determined based on a target image quality.

4. The method of claim 1, further comprising:
   monitoring for a receipt of a second updated image frame from the external electronic device; and
   receiving the second updated image frame from the external electronic device.

5. The method of claim 1, further comprising, responsive to receiving a second updated image frame:
   calculating a second updated pose based on one or more characteristics of the second updated image frame;
   determining that the second updated pose is not within the pose range with respect to the current pose; and
   determining whether one or more anchors corresponding to the second updated pose are stored on the XR display device.

6. The method of claim 5, further comprising:
   in response to determining that the one or more anchors corresponding to the second updated pose are stored on the XR display device, accessing image data or depth data corresponding to the one or more anchors.

7. The method of claim 6, further comprising:
   determining whether the second updated pose is within an updated pose range corresponding to the one or more anchors; and
   rendering, on the one or more displays of the XR display device, the second updated image frame when the second updated pose is determined to be within the updated pose range.

8. The method of claim 1, wherein re-rendering, on the one or more displays of the XR display device, the previous image frame comprises re-rendering the previous image frame at the current pose.

9. An extended reality (XR) display device comprising:
   one or more displays;
   one or more non-transitory computer-readable storage media including instructions; and
   one or more processors coupled to the storage media, the one or more processors configured to execute the instructions to:
   render a current image frame received from an external electronic device associated with the XR display device, wherein the current image frame is associated with a current pose of the XR display device;
   receive an updated image frame from the external electronic device;
   calculate an updated pose based on one or more characteristics of the updated image frame;
   determine whether the updated pose is within a pose range with respect to the current pose; and
   re-render, on one or more displays of the XR display device, a previous image frame based on whether the current pose is determined to be within the pose range.

10. The XR display device of claim 9, wherein the one or more characteristics comprise one or more of an image content range, a depth density, an image content depth, or a depth continuity.

11. The XR display device of claim 9, wherein the instructions further comprise instructions to:
    prior to determining whether the updated pose is within the pose range with respect to the current pose, calculate the pose range with respect to the current pose, wherein the pose range is determined based on a target image quality.

12. The XR display device of claim 9, wherein the instructions further comprise instructions to:
  monitor for a receipt of a second updated image frame from the external electronic device; and
  receive the second updated image frame from the external electronic device.

13. The XR display device of claim 9, wherein, responsive to receiving a second updated image frame, the instructions further comprise instructions to:
  calculate a second updated pose based on one or more characteristics of the second updated image frame;
  determine that the second updated pose is not within the pose range with respect to the current pose; and
  determine whether one or more anchors corresponding to the second updated pose are stored on the XR display device.

14. The XR display device of claim 13, wherein the instructions further comprise instructions to:
  in response to determining that the one or more anchors corresponding to the second updated pose are stored on the XR display device, access image data or depth data corresponding to the one or more anchors.

15. The XR display device of claim 14, wherein the instructions further comprise instructions to:
  determine whether the second updated pose is within an updated pose range corresponding to the one or more anchors; and
  render, on the one or more displays of the XR display device, the second updated image frame when the second updated pose is determined to be within the updated pose range.

16. The XR display device of claim 9, wherein the instructions to re-render, on the one or more displays of the XR display device, the previous image frame comprise instructions to re-rendering the previous image frame at the current pose.

17. A non-transitory computer-readable medium comprising instructions that, when executed by one or more processors of an extended reality (XR) display device, cause the one or more processors to:
  render a current image frame received from an external electronic device associated with the XR display device, wherein the current image frame is associated with a current pose of the XR display device;
  receive an updated image frame from the external electronic device;
  calculate an updated pose based on one or more characteristics of the updated image frame;
  determine whether the updated pose is within a pose range with respect to the current pose; and
  re-render, on one or more displays of the XR display device, a previous image frame based on whether the current pose is determined to be within the pose range.

18. The non-transitory computer-readable medium of claim 17, wherein, responsive to receiving a second updated image frame, the instructions further comprise instructions to:
  calculate a second updated pose based on one or more characteristics of the second updated image frame;
  determine that the second updated pose is not within the pose range with respect to the current pose; and
  determine whether one or more anchors corresponding to the second updated pose are stored on the XR display device.

19. The non-transitory computer-readable medium of claim 18, wherein the instructions further comprise instructions to:
  in response to determining that the one or more anchors corresponding to the second updated pose are stored on the XR display device, access image data or depth data corresponding to the one or more anchors.

20. The non-transitory computer-readable medium of claim 19, wherein the instructions further comprise instructions to:
  determine whether the second updated pose is within an updated pose range corresponding to the one or more anchors; and
  render, on the one or more displays of the XR display device, the second updated image frame when the second updated pose is determined to be within the updated pose range.

* * * * *